US006625861B2

(12) United States Patent
Whetstone et al.

(10) Patent No.: US 6,625,861 B2
(45) Date of Patent: Sep. 30, 2003

(54) METHODS AND APPARATUS FOR REMOVING A SLUG FROM A FRAME OF AN AUTOMOBILE

(75) Inventors: Thomas Nolen Whetstone, Clarkston, MI (US); Martin H. MacDonald, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 262 days.

(21) Appl. No.: 09/770,477

(22) Filed: Jan. 29, 2001

(65) Prior Publication Data

US 2002/0100170 A1 Aug. 1, 2002

(51) Int. Cl.[7] .................................................. B23P 6/00

(52) U.S. Cl. ..................... 29/402.06; 29/426.5; 29/252; 29/267

(58) Field of Search ............................. 29/897.2, 426.4, 29/426.5, 426.1, 402.01, 402.06, 402.03, 239, 267, 252

(56) References Cited

U.S. PATENT DOCUMENTS

| | | | | | |
|---|---|---|---|---|---|
| 4,514,890 | A | * | 5/1985 | Stewart | 29/256 |
| 5,068,953 | A | * | 12/1991 | Semotiuk | 29/235 |
| 5,339,506 | A | * | 8/1994 | Nusz | 29/252 |
| 5,701,650 | A | * | 12/1997 | LaFleur et al. | 29/267 |
| 6,226,847 | B1 | * | 5/2001 | Breton | 29/267 |

FOREIGN PATENT DOCUMENTS

EP 0555584 A1 * 8/1993

* cited by examiner

*Primary Examiner*—Gregory Vidovich
*Assistant Examiner*—T. Nguyen
(74) *Attorney, Agent, or Firm*—Laura C. Hargitt

(57) ABSTRACT

A method is provided for removing a slug from a frame of an automobile. A mandrel configured for insertion into an aperture of the slug and a mandrel engaging plate configured to engage the mandrel. The method also includes a cammed jaw connected to the mandrel engaging plate and an actuator. The mandrel engaging plate is configured to engage the automobile frame and the actuator is configured to separate the cammed jaw from the mandrel engaging plate such that the mandrel is drawn through the aperture of the slug, thereby removing the slug from the automobile frame.

4 Claims, 2 Drawing Sheets

METHODS AND APPARATUS FOR REMOVING A SLUG FROM A FRAME OF AN AUTOMOBILE

TECHNICAL FIELD

The present invention relates generally to automobile slug removal, and more particularly to methods and apparatus for removing a slug from a frame of an automobile.

BACKGROUND OF THE INVENTION

Automobiles are typically designed with portions of the suspension fixed in a predetermined position, such that the suspension is pre-aligned prior to installation into the automobile. This is particularly applicable to the front suspension and more particularly applicable to the upper control arm pocket frame of the front suspension. Unfortunately, suspensions become misaligned and adjustments are desirable after initial assembly of an automobile is complete. Therefore, the automobile industry has provided a mechanism for suspension realignments.

More specifically, the frame of the suspension is manufactured with multiple mounting apertures that have been completely or partially covered with preformed, perforated or plastically deformed material to facilitate removal. The re-alignment of the suspension is accomplished with the selection of a mounting aperture that positions the suspension in a realigned position, removing the material to open the selected mounting aperture, and re-mounting the frame at the selected mounting aperture. Thus, these preformed, perforated or plastically deformed mounting apertures provided a viable solution for the realignment of the suspension after initial assembly of the automobile.

Attempts have been made to provide efficient and consistent removal of the material that covers the mounting apertures, which is typically referred to as a slug. For example, in one prior art method, a hammer and punch was used to remove the slug. In a second prior art method, a grinder was used to remove the slug covering the mounting aperture, and in a third prior art method a manual threaded tool was used to force the slug out of the mounting aperture. However, these prior art methods have not generally provided time efficient and consistent results.

In view of the forgoing, it should be appreciated that it would be desirable to provide methods and apparatus for removing a slug from an automobile frame that are efficient and produce consistent results. Furthermore, additional desirable features will become apparent to one skilled in the art from the following detailed description of a preferred exemplary embodiment and appended claims.

SUMMARY OF THE INVENTION

In accordance with the teachings of the present invention, methods and apparatus are provided for removing a slug from an automobile frame. The apparatus includes a mandrel configured for insertion into an aperture of the slug and a mandrel engaging plate configured to engage the mandrel. The apparatus also includes a cammed jaw connected to the mandrel engaging plate and an actuator. The mandrel engaging plate is configured to engage the automobile frame and the actuator is configured to separate the cammed jaw from the mandrel engaging plate such that the mandrel is drawn through the aperture of the slug, thereby removing the slug from the automobile frame.

DETAILED DESCRIPTION OF A PREFERRED EXEMPLARY EMBODIMENT

The following detailed description of a preferred exemplary embodiment of the invention is mainly exemplary in nature and is not intended to limit the invention or its application or uses.

Figure 1:
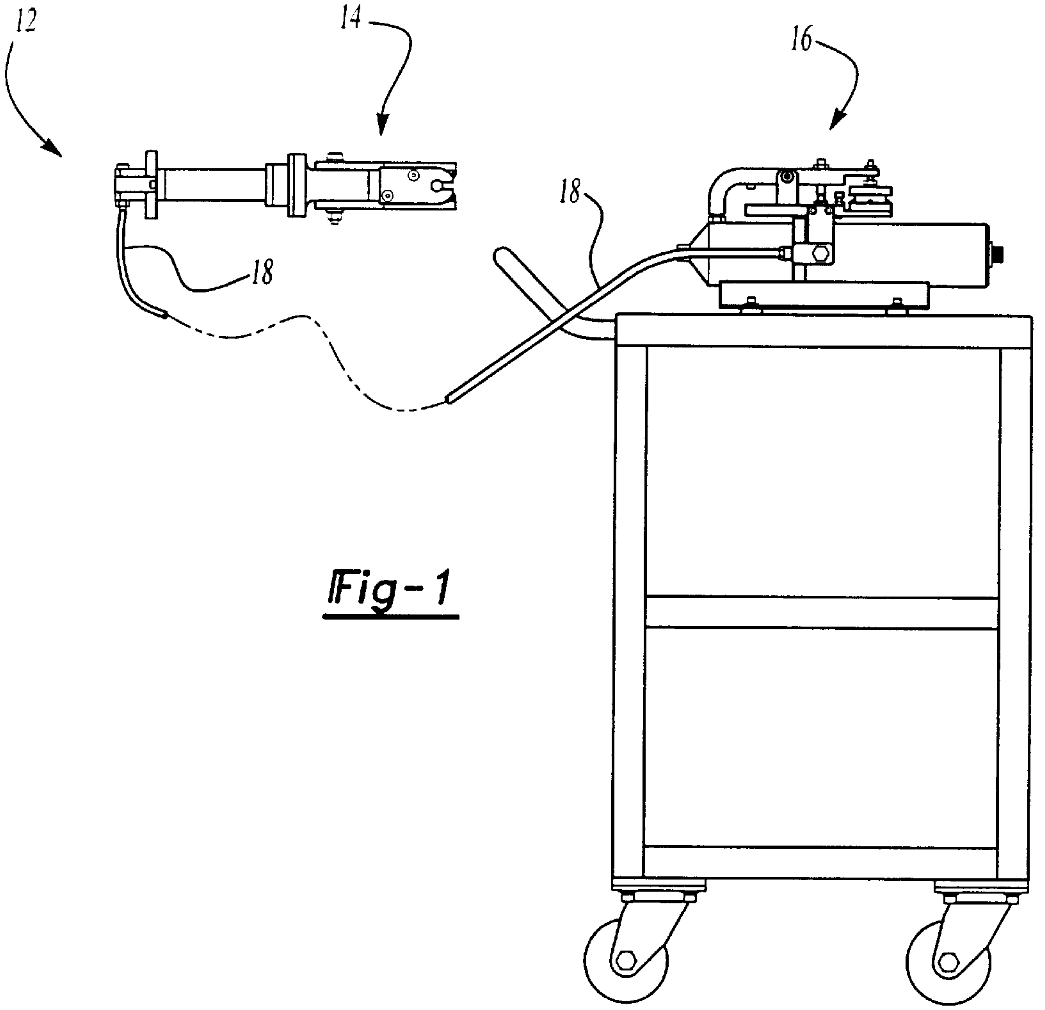
FIG. 1 is an apparatus for removing a slug from an automobile frame according to a preferred exemplary embodiment of the present invention.

Referring to FIG. 1, an apparatus 12 is illustrated for removing a slug from an automobile frame according to a preferred exemplary embodiment of the present invention. The apparatus 12 includes, but is not limited to, a slug puller assembly 14 and charging unit 16. The slug puller assembly 14 and charging unit 16 are connected with a conduit 18. In a preferred embodiment, the conduit 18 is a hydraulic fluids line that channels hydraulic fluids from the charging unit to hydraulically drive the slug puller assembly 14. In a non-limiting embodiment, the conduit 18 can transfer fluids from a number of charging means (e.g. hydraulically, pneumatically, electrically or there like) to the slug puller assembly 14.

Figure 2:
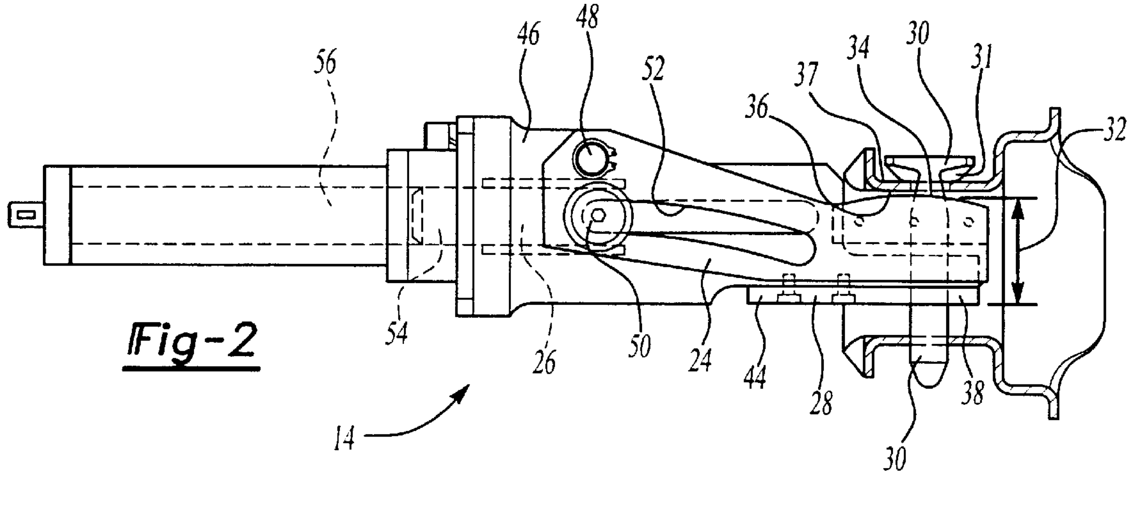
FIG. 2 is a top view of the slug puller assembly before the slug has been removed from the automobile frame.
Figure 3:
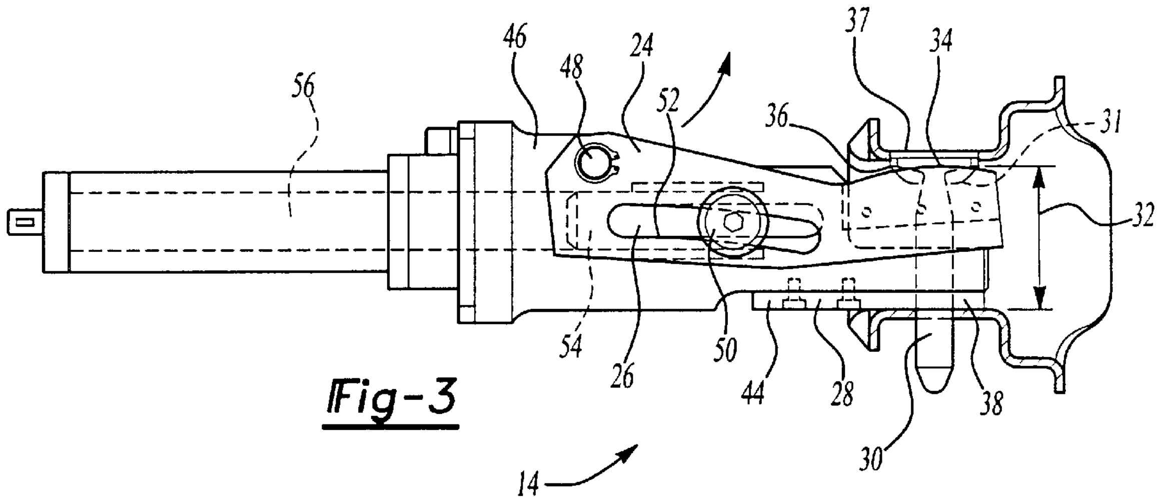
FIG. 3 is a top view of the slug puller assembly after the slug has been removed from the automobile frame.

Referring to FIGS. 2 and 3, the slug puller assembly 14 of FIG. 1 is shown in greater detail according to a preferred exemplary embodiment of the present invention. The slug puller assembly 14 is preferably configured to remove a slug 20 from a frame 22, more preferably configured to remove a slug 20 from a frame 22 of an automobile suspension, and most preferably configured to remove a slug 20 from a frame 22 of an automobile front suspension. However, the present invention is configurable for removing a slug from any number of automobile support structures and components. The slug puller assembly 14 includes, but is not limited to a cammed jaw 24, and a actuator assembly 26, a mandrel engaging plate 28 and a mandrel 30.

The mandrel 30 is configured for insertion into an aperture in the slug 20 and the mandrel engaging plate 28 is configured to engage the mandrel 30. The cammed jaw 24 is connected to the mandrel engaging plate 28 and configured to engage the inner surface 36 of frame 22 causing the mandrel head 31 to contact the outer surface 37 of the frame 22. The actuator assembly 26 is configured to move the cammed jaw 24 such that a distance 32 between a contact surface 34 of the cammed jaw 24 and the mandrel engaging plate 28. The increase in the distance 32 between the contact surface 34 and the mandrel engaging plate 28 results in the contact surface 34 of the cammed jaw 24 contacting the inner surface 36 of the frame 22 and the mandrel engaging plate 28 engaging the mandrel 30. These actions draw the mandrel 30 through the aperture of the slug 20, thereby removing the slug 20 from the frame 22. The removal of the slug 20 from the frame 22 can consist of a complete removal of the slug 20 from the frame 22 to open an aperture in the frame 22, a partial removal of the slug 20 to open an aperture in the frame 22, or an adjustment to the reposition of the slug 20 to open the aperture in the frame 22.

Figure 4:
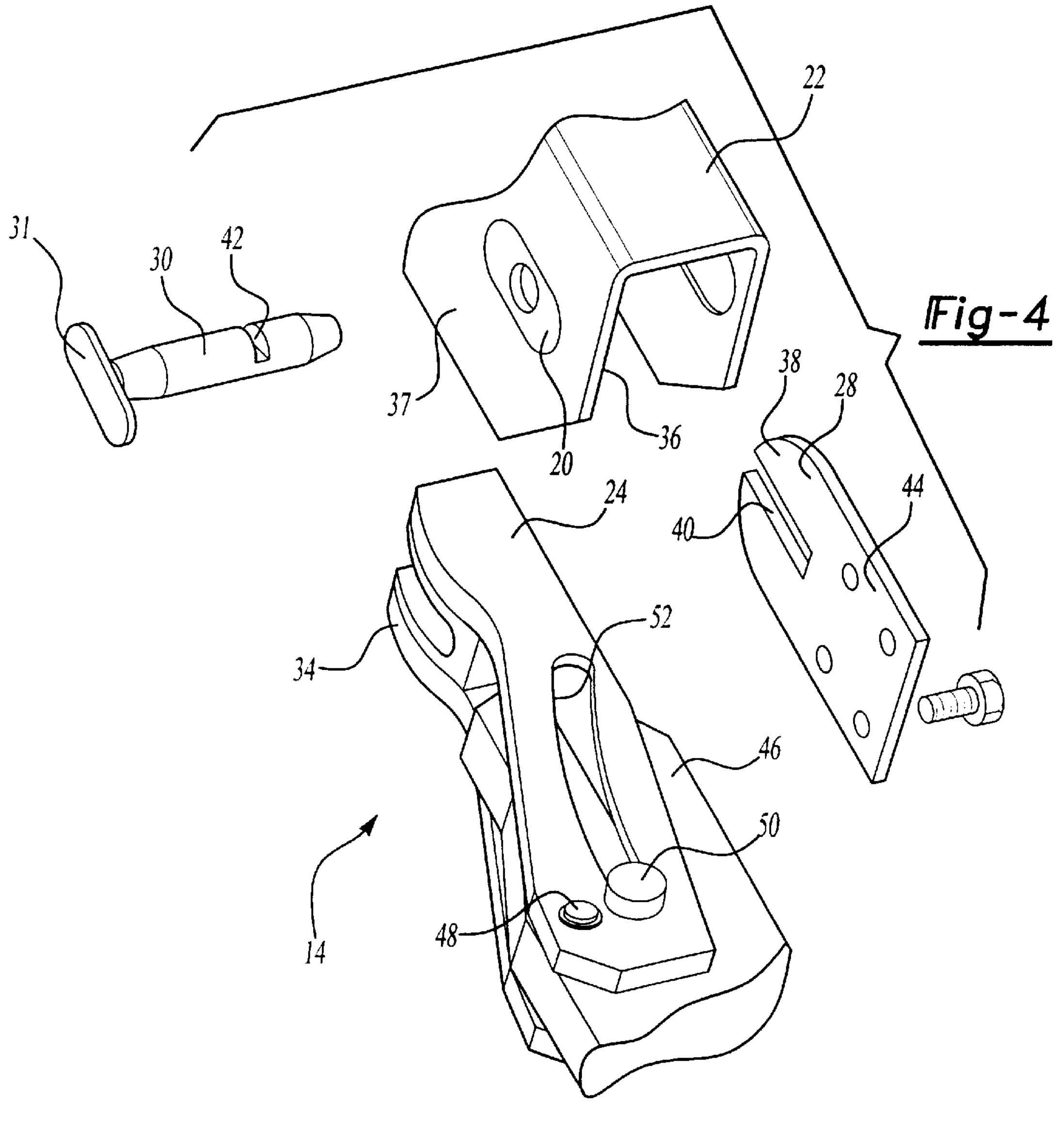
FIG. 4 is an exploded perspective of the mandrel and mandrel engaging plate.

Referring momentarily to FIG. 4, the mandrel engaging plate 28 is provided with a first end 38 having a channel 40 for engaging a mating neck 42 of the mandrel 30 and a second end 44 for attachment to a slug puller housing 46, which is also attached to the cammed jaw 24 (FIG. 2 and 3). Continuing with reference to FIGS. 3 and 4, the cammed jaw 24 is preferably attached to the slug puller housing 46 with a pivot pin 48. The attachment of the cammed jaw 24 to the slug puller housing 46 with the pivot pin 48 provides a pivot action of the cammed jaw 24 about the pivot pin 48 as a protruding drive rod 50 of the actuator assembly 26 traverses an elongated groove 52 of the cammed jaw 24, which is preferably a concave groove and more preferably a concave groove towards the mandrel engaging plate. The movement of the protruding drive rod 50 in a first direction pivots the cammed jaw 24 about the pivot pin 48 to increase the distance 32 between the contact surface 34 of the cammed jaw 24 and the mandrel engaging plate 28. Conversely, movement of the protruding drive rod 50 in a second direction, which is substantially opposite to the first direction, pivots the cammed jaw 24 to decrease the distance 32 between the contact surface 34 of the cammed jaw 24 and mandrel engaging plate 28.

The movement of the protruding drive rod 50 in the first and second direction to pivot the cammed jaw 40 about the pivot pin 48 is provided by the actuator assembly 26, which includes, but is not limited to a piston 54 and a cylinder 56. The protruding drive rod 50 is connected to the piston 54 and the piston 54 is contained within the cylinder 56. The cylinder 56 also contains a fluid that is increased in volume through the transfer of fluid from the charging unit 16 (FIG. 1) to the cylinder 56. Therefore, as the fluid volume is increased in the cylinder 56, the piston 54 vacates the cylinder 56 and moves the protruding drive rod 50 in the first direction. Conversely, as the fluid volume is decreased in the cylinder 56, the piston 54 enters the cylinder 56 and moves the protruding drive rod 50 in the second direction. As previously discussed in this detailed description of a preferred exemplary embodiment, the movement in the first direction pivots the cammed jaw about the pivot pin 48 to increase the distance 32 between the contact surface 34 of the cammed jaw 24 and mandrel engaging plate 28. The increase in the distance 32 between the contact surface 34 and the mandrel engaging plate 28 results in the contact surface 34 of the cammed jaw 24 contacting the inner surface 36 of the frame 22 and the mandrel engaging plate 28 engaging the mandrel 30, thereby drawing the mandrel 30 through the aperture in the slug 20 and removing the slug 20 from the frame 22.

From the foregoing, it should be appreciated that methods and apparatus are provided for removing a slug from an automobile frame that are efficient and produce consistent results. In addition, while the foregoing detailed description provides a preferred exemplary embodiment, it is not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. A method for removing a slug from an automobile frame, comprising:

inserting a mandrel into an aperture of the slug;

engaging said mandrel with a mandrel engaging plate;

separating a cammed jaw from said mandrel engaging plate such that said mandrel is drawn through said aperture of the slug and removes the slug from the automobile frame;

wherein said engaging said mandrel with said mandrel plate comprises engaging a mating neck of said mandrel with a channel of said mandrel engaging plate and wherein separating said cammed jaw from said mandrel engaging plate comprises pivoting said cammed jaw about a pivot pin of a slug puller housing as a protruding drive rod of an actuator assembly traverses an elongated groove of said cammed jaw.

2. The method of claim 1, wherein pivoting said cammed jaw about said pivot pin further comprises moving said protruding drive rod in a first direction such that said cammed jaw pivots about said pivot pin and a distance between a contact surface of said cammed jaw and said mandrel engaging plate is increased.

3. The method of claim 2, wherein pivoting said cammed jaw about said pivot pin further comprises moving said protruding drive rod in a second direction such that said cammed jaw pivots about said pivot pin and said distance between said contact surface of said cammed jaw and said mandrel engaging plate is decreased.

4. The method of claim 2, wherein moving said protruding drive rod in said first direction comprises increasing the volume of a fluid contained in a cylinder with said piston.

* * * * *